United States Patent [19]
Sioma

[11] 3,813,539
[45] May 28, 1974

[54] ELECTRO-OPTICAL COUPLER UNIT

[75] Inventor: Edward M. Sioma, Levittown, Pa.

[73] Assignee: Rohm & Haas Company, Philadelphia, Pa.

[22] Filed: Jan. 31, 1973

[21] Appl. No.: 328,554

[52] U.S. Cl. .............. 250/206, 250/213 A, 307/311
[51] Int. Cl. .............................................. H01j 39/12
[58] Field of Search ........ 307/311; 250/213 A, 214, 250/206

[56] References Cited

UNITED STATES PATENTS

| | | | |
|---|---|---|---|
| 3,461,300 | 8/1969 | Braun | 307/311 |
| 3,519,828 | 7/1970 | Milford | 250/214 |
| 3,534,351 | 10/1970 | Harnden | 307/311 |
| 3,535,532 | 10/1970 | Merryman | 250/211 J |
| 3,573,466 | 4/1971 | Von Feldt | 250/206 |
| 3,723,769 | 3/1973 | Collins | 307/311 |
| 3,684,898 | 8/1972 | Wood | 307/311 |

OTHER PUBLICATIONS

"A Symmetrical–Transistor Steering Circuit" - Walsh IBM Jour. April 1957,

*Primary Examiner*—Archie R. Borchelt
*Assistant Examiner*—D. C. Nelms

[57] ABSTRACT

The present invention is concerned with an electro-optical coupler unit using a transistor in conjunction with a photocell and an actuating light source having improved reliability by virtue of the circuitry of the system. In accordance with the present invention the transistor in the photocell circuit is arranged to operate in an inverted mode rather than in the normal mode. By virtue of such operation, interference with operation of the control unit containing the photocell and transistor as a result of stray electromagnetic disturbances is effectively eliminated.

9 Claims, 7 Drawing Figures

ELECTRO-OPTICAL COUPLER UNIT

DESCRIPTION OF THE INVENTION

Figure 1:
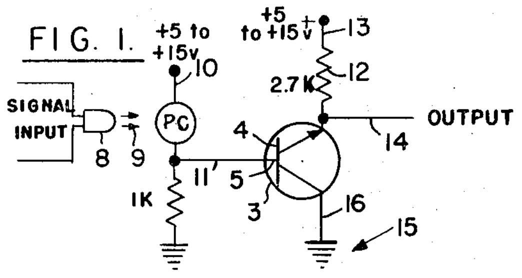

In accordance with the present invention a radiatively coupled electronic control system is provided using a light source which is energized at a predetermined time or at predetermined intervals as a result of receiving a pulse of current in the primary circuit containing the light source. The light source may be any suitable device, such as an incandescent lamp or a "solid state" light emitter or any other device which, upon excitation, emits light of any suitable wave length embracing infrared, ultraviolet and the normal visual range. The energization of this light source may be effected in any suitable manner by a source of electric current supply, such as an electric battery or power line of suitable voltage, connected to the primary circuit and under the control of any suitable switch in the circuit which is a component of a relay and may be closed by a solenoid energized by a computer, a timer, or the like.

The light-receiving device may be any photoconductive or photovoltaic cell. Such photocell must of course be chosen to be sensitive to or respond to the wave length of the light emitted by the light source used in the primary circuit.

As stated in the abstract above, the photocell is in a circuit (herein referred to as the secondary circuit) which embraces a transistor. It is essential for the purposes of this invention that the transistor be of unsymmetrical type, i.e., the components of the transistor are so chosen that when it is connected in the normal mode the current through the emitter electrode is greater than such current when the transistor is connected in the inverted mode. This characteristic of the transistor is commonly expressed in the expression $\alpha_n > \alpha_i$.

In accordance with the present invention the transistor is arranged to operate in inverted mode and in that arrangement the current that passes through the emitter electrode is less than that passing through the photocell to the base electrode of the transistor.

Figure 5:
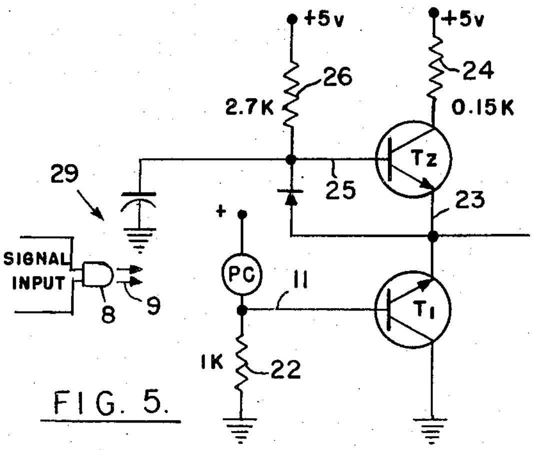
Figure 2:
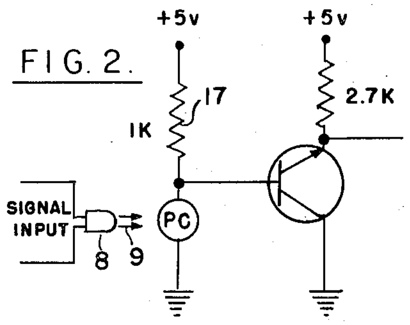
Figure 6:
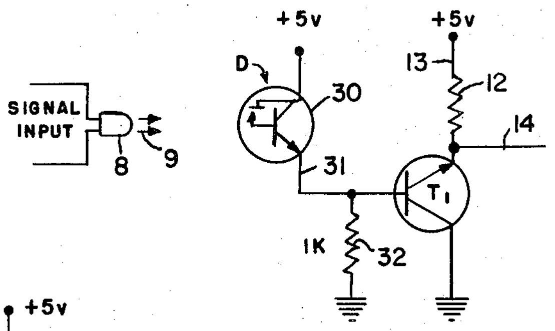
Figure 3:
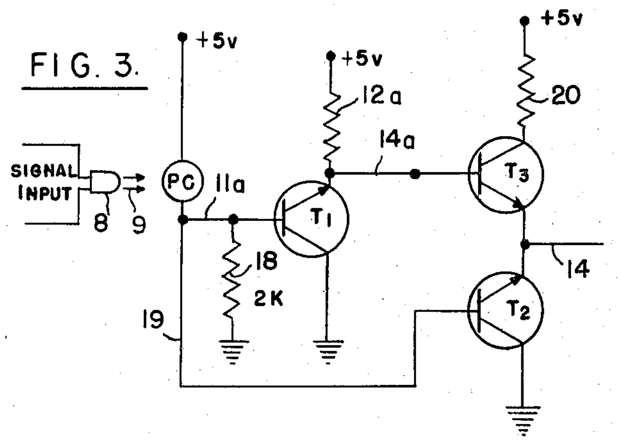
Figure 7:
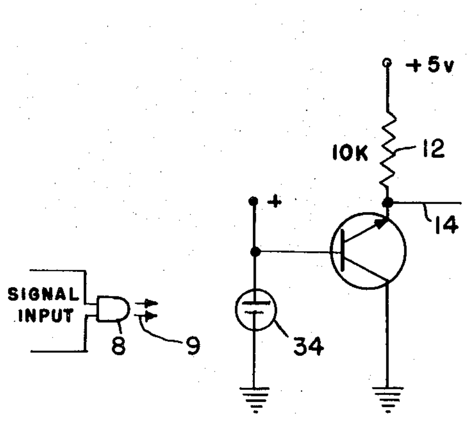
Figure 4:
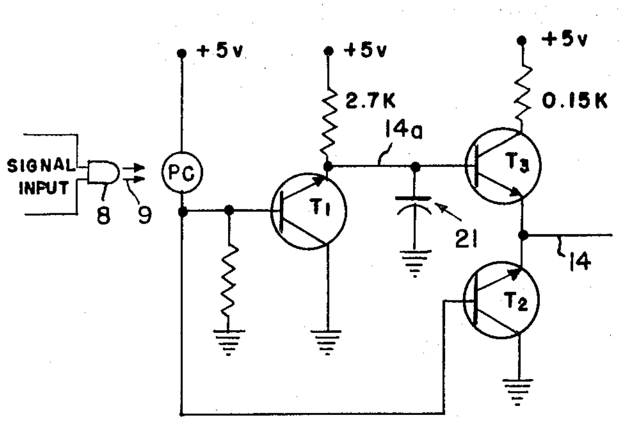

In the drawing,

FIG. 1 is a diagrammatic representation of the basic system of the electro-optical coupler of the present invention, FIG. 2 shows a modification, FIG. 3 shows a second modification, FIG. 4 shows another embodiment, FIG. 5 shows a fourth modification, FIG. 6 shows a fifth modification, and FIG. 7 shows a modification of FIG. 1 using a photovoltaic cell in place of the more common and more versatile photoconductive cell.

It is to be understood that the values of potential, resistance, etc. mentioned in the specification and shown in the drawing are merely exemplary and the invention is not restricted to these values.

In all of the embodiments shown in the drawing the following conventional terminology is used in referring to the components of the transistor. Thus the transistor 3 in FIG. 1 is diagrammatically shown in a circle with the vertical line 4 therein representing the transistor base, the horizontal line 5 representing the base electrode, the upwardly-sloped arrow 6 representing the emitter electrode, and the downwardly-sloped line 7 representing the collector electrode.

In the basic embodiment of the present invention shown in FIG. 1 the input circuit includes the light source 8, the two terminals of which are connected to any source of electricity by a circuit which includes a switch for controlling the flow of electricity through the light source. The switch may be operated in conventional fashion by a timing device, which may be controlled by a computer. The timing device is constructed or "programmed" to close the primary circuit and thereby to energize the light source 8 at an appropriate time or at the proper stage in a sequence of several operations depending on whether operation of the control circuit is desired to be independent of, or to have a time relation to, other steps in a sequence of operations.

Reference numeral 9 is applied to the light transmission path between the light source and the photosensitive cell in the secondary circuit. The latter cell is shown as a circle containing the letters "P.C." One electrode of the photocell is connected by line 10 to a source of B+ potential, e.g., 5 to 15 volts. The other electrode of the photocell is connected to the base electrode 5 of the transistor by a conductor line 11 and is grounded through a resistance, such as of 1,000 ohms (1 kiloohm — 1K).

So that the transistor will operate in inverted mode, the emitter electrode 6 is connected through a resistance 12 and line 13 to a source of B+ potential (such as approximately 5 to 15 volts) which may be the same source but need not be the same source as that to which the line 10 is connected. The output line 14 is connected to the junction between the emitter electrode 6 and resistance 12 and the collector electrode 7 is connected to a ground 15 by a line 16. The output line (the connecting lines referred to are all conductors for electricity) is connected to the device that is to be controlled, one of the terminals of that device being grounded to provide a complete circuit through line 16 to the collector electrode.

While the unsymmetrical transistor may be so selected that, in its normal mode of operation, it is characterized by an amplification of current through the emitter 6 and collector 7 from two to 100 or more times that of the current passing through the photocell to the base electrode, it is generally desirable to select such a transistor as would amplify on the order of 20 to 100 times, and preferably about 40 to 60 times when employed in the normal mode.

In operation in the inverted mode, the current through the emitter 6 and collector 7 is decreased relative to the current through the base electrode of the photocell. Such decrease may be from say about one-half to a one-hundredth of the current through the base electrode. The merit in having such decrease occur arises from the fact that any stray electromagnetic disturbances acting upon the photocell circuit and especially the conductor 11 in the secondary circuit by inducing an electric current therein are reduced in magnitude in output line 14. Because of this fact, the stray currents (which are considerably lower in magnitude than the normal operating current that would be produced in line 11 by the detection of the light in the photocell) would be so clearly reduced that they cannot appreciably affect the current in output line 14 and hence cannot cause unintended or adventitious operation of the output circuit in controlling whatever device may be connected to the output of the secondary circuit. The result is enhanced reliability of the control circuit and assurance that it is not operated by stray electromagnetic disturbances.

In the electronics art, when an unsymmetrical transistor is connected in normal mode, the current relationship may be represented mathematically by $\alpha_n > \alpha_i$. In other words, the normal current amplification or gain is greater than the inverted amplification or gain.

While FIG. 1 shows line 16 going to ground 15, the line 16 may instead go directly to the terminal of the device being controlled other than the terminal to which line 14 is connected.

The output of this radiatively-coupled unit may be used for controlling and monitoring any suitable device. It may be used to initiate or stop a chromatograph or other testing or measuring instrument or it may be used to initiate or stop any other device. For example, it may be used to open or close the door to an oven in which a sample is to be tested or prepared for testing. Again, it may be used to initiate or stop the operation of a heating device or of a cooling device. To accomplish any of these purposes the current in the output line may be directed through the solenoid of a relay which actuates a switch controlling the circuit which operates the device which the circuit is to control.

In FIG. 2 a modification is shown wherein the light source 8 energizes a photocell one electrode of which is connected to the base electrode of the transistor and to a resistance element 17 which is connected to a source of B+ potential. The other electrode of the photocell is connected to ground. Otherwise the transistor is connected in the same fashion as in FIG. 1.

In FIG. 3 light source 8 energizes the photocell one terminal of which is connected to a source of B+ potential and the other is connected to the base electrode of the transistor $T_1$ through a line 11a which is connected through a resistance 18 to ground and also by line 19 to the base electrode of a second transistor $T_2$ the collector electrode of which is grounded. The emitter electrode of $T_1$ is connected through a resistance 12*a* to a source of B+ potential and the output line 14*a* is connected to the base electrode of a third transistor $T_3$. The collector electrode of $T_3$ is connected to a source of B+ potential through a resistor 20 (such as 150 ohms). The emitter electrode of $T_3$ and the emitter electrode of $T_2$ are connected to a common output line 14. This modification of circuit has lower impedance. It generates greater current and has greater fidelity even though a longer output line 14 is used for transmission. The transistor $T_3$ is connected in the normal mode and in an emitter-follower configuration. Transistors $T_1$ and $T_2$ are connected in the inverted mode.

The embodiment of FIG. 4 differs only from FIG. 3 in the addition of a capacitor 21 one terminal plate of which is connected to line 14*a* and the other is grounded. This embodiment increases the noise rejections, slows down the signal transmission, or cuts down the band width.

In FIG. 5 the photocell has one terminal connected to a source of B+ potential and the other terminal connected through line 11 to the base electrode of transistor $T_1$ and also to resistance 22 which in turn is connected to ground. The collector electrode of $T_1$ is grounded and the emitter electrode is connected to the emitter electrode of transistor $T_2$ by the line 23. The collector electrode of the transistor $T_2$ is connected through the resistance 24 to a source of B+ potential whereas the base electrode is connected to line 25 having a junction with resistance 26, a terminal plate of capacitor 27, and the cathode of diode D. The anode of diode D is connected to line 23 and the output line 14. The other terminal plate of the capacitor is grounded at 29. This embodiment is more effective in eliminating in the output any noise signal picked up therein by ambient electromagnetic disturbances.

FIG. 6 is an embodiment wherein the photocell 30 embodies in its own structure an amplifier comprising the diode D shown connected within the structure of the photocell. One terminal of the photocell is connected to a source of B+ potential whereas the other is connected by a line 31 to the base electrode of transistor $T_1$. The line 31 is also connected through resistance 32 to ground and the collector electrode of the transistor is also connected to ground. The output line 14, resistance 12, and line 13 connected to a source of B+ potential are the same as in the embodiment of FIG. 1.

In FIG. 7 the photocell takes the form of a photovoltaic cell rather than the more common and more versatile photoconductive cell. The photovoltaic cell is shown at 34. Its negative electrode is grounded and the positive electrode is connected to the base electrode of the transistor of $T_1$. The emitter electrode is connected to the output 14 and to a source of B+ potential through the resistance 12; the collector electrode is grounded, all as in FIG. 1.

FIG. 1 through FIG. 7 show the basic circuit configuration and modifications to it utilizing NPN type transistors. All these circuits will operate in like manner with PNP type transistors when the source potential is changed from positive to negative, all diodes are reversed and all polarity-sensitive photocells are reversed.

In all embodiments, the photocell, whether photoconductive or photovoltaic, is connected with a transistor which is arranged to operate in inverted mode. By virtue of this operation, the influence or interference of stray electromagnetic disturbances in the output circuit is effectively eliminated. Such disturbances may be quite common in the areas wherein it is desired to utilize a light-coupled system for controlling a device. For example, if the system is used to control operation of a chromatograph which is automatically supplied at spaced intervals with samples of a fluid medium by the action of a pump nearby, the starting and stopping of the pump, particularly if it is driven electrically, gives rise to an electrical disturbance which potentially may cause a false signal. If an electro-optically coupled control system in which no transistor is arranged to operate in inverted mode were used near sources of such electrical disturbances, they would frequently cause operation of the controlled device when such operation is not wanted. By arranging the transistor in the photocell circuit so that it operates in inverted mode, the influence or interference caused by stray electromagnetic disturbances is greatly dimished or eliminated for all practical purposes. This gives rise to a reliable operation of the device.

I claim:

1. In a photocoupled system for controlling operation of an electrically operated device in which the primary or signal circuit has a light source and means for energizing the light source at a predetermined time to produce a light signal, and the secondary circuit for controlling the device comprises a photosensitive unit for receiving the light signal and an unsymmetrical transistor having the characteristic that $\alpha_n > \alpha_i$, one terminal of the photosensitive unit being grounded and the other being connected to a source of B+ potential, one of these terminals also being connected to the base electrode of the transistor, one of the other transistor electrodes being grounded and the third transistor electrode being connected to a source of B+ potential and the output conductor, the improvement wherein the collector electrode of the transistor is the one that is connected to the ground.

2. A system according to claim 1 in which a resistor element is provided in the connection of the photosensitive unit to the ground and a resistor element is provided in the connection of the emitter electrode to the source of B+ potential.

3. A system according to claim 1 in which a resistor element is provided in the connection of the photocell to the source of B+ potential.

4. A system according to claim 2 in which two additional transistors are provided in the secondary circuit with the output conductor of the first-mentioned transistor connected to the base electrode of one of the additional transistors and the grounded terminal of the photosensitive unit being connected to the base electrode of the third transistor, the emitter electrodes of each of the two additional transistors being connected to the output conductor, the collector electrode of the second-mentioned transistor being connected to a source of B+ potential, and the collector electrode of the third transistor being grounded.

5. A system according to claim 4 in which a capacitor is also provided and has one plate connected to the emitter electrode of the first mentioned transistor and its other plate to ground.

6. A system according to claim 2 comprising an additional transistor, a diode, and a capacitor in the secondary circuit and in which the emitter electrode of the second transistor is connected to the emitter electrode of the first and to the anode of the diode, the collector electrode of the second transistor is connected to a source of B+ potential, and the base electrode of the second transistor is connected to the cathode of the diode, to a source of B+ potential and to one terminal of a capacitor, the other terminal of the capacitor being grounded.

7. A system in accordance with claim 1 in which the photosensitive unit is a photoconductive cell.

8. A system in accordance with claim 1 in which the photosensitive unit is a photovoltaic cell with its plate connected to the base electrode of the transistor and to a source of B+ potential.

9. A system in accordance with claim 1 in which the photosensitive unit is of the type wherein it embodies a self-contained amplifier.

* * * * *